(12) United States Patent
Kim

(10) Patent No.: US 11,951,955 B2
(45) Date of Patent: Apr. 9, 2024

(54) ELECTROHYDRAULIC BRAKE APPARATUS

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 401 days.

(21) Appl. No.: 17/236,225

(22) Filed: Apr. 21, 2021

(65) Prior Publication Data

US 2021/0331658 A1    Oct. 28, 2021

(30) Foreign Application Priority Data

Apr. 24, 2020    (KR) .................. 10-2020-0050087

(51) Int. Cl.
*B60T 13/68*    (2006.01)
*B60T 8/171*    (2006.01)
(Continued)

(52) U.S. Cl.
CPC .......... *B60T 13/686* (2013.01); *B60T 8/171* (2013.01); *B60T 8/1755* (2013.01);
(Continued)

(58) Field of Classification Search
CPC .... B60T 13/148; B60T 13/662; B60T 13/745; B60T 13/686; B60T 13/145; B60T 13/586; B60T 7/042; B60T 7/12; B60T 8/1755; B60T 8/26; B60T 8/46; B60T 8/171; B60T 8/268; B60T 2201/03; B60T 2220/04;
(Continued)

(56) References Cited

U.S. PATENT DOCUMENTS

| | | | |
|---|---|---|---|
| 8,152,245 B2* | 4/2012 | Lubbers | B60T 13/586 303/151 |
| 9,010,881 B2* | 4/2015 | Sekiya | B60L 7/26 188/1.11 R |
| 2011/0160970 A1* | 6/2011 | Crombez | B60T 8/321 303/3 |

(Continued)

FOREIGN PATENT DOCUMENTS

| | | |
|---|---|---|
| CN | 104176032 A | 12/2014 |
| CN | 104417517 A | 3/2015 |

(Continued)

OTHER PUBLICATIONS

Chinese Office Action dated Jun. 9, 2023, issued in corresponding Chinese Patent Application No. 2021104370652.

*Primary Examiner* — Robert A. Siconolfi
*Assistant Examiner* — San M Aung
(74) *Attorney, Agent, or Firm* — Morgan, Lewis & Bockius LLP

(57) ABSTRACT

An electrohydraulic brake apparatus includes: a reservoir; a stroke sensor; a plurality of wheel brake assemblies; a main master cylinder; an electric booster; an electronic stability control system; and an electronic control unit configured to control the ESC system so that a fluid pressure supplied to the ESC system brakes only part of the plurality of wheel brake assemblies when the pedaling amount is less than or equal to a first reference, and to control the ESC system so that the fluid pressure supplied to the ESC system brakes all of the plurality of wheels brake assemblies when the pedaling amount is greater than the first reference.

9 Claims, 4 Drawing Sheets

(51) Int. Cl.
  *B60T 8/1755* (2006.01)
  *B60T 13/14* (2006.01)
(52) U.S. Cl.
  CPC .......... *B60T 13/145* (2013.01); *B60T 13/148* (2013.01); *B60T 2220/04* (2013.01)
(58) Field of Classification Search
  CPC ........... B60T 2270/60; B60T 2270/604; B60T 2270/608; B60T 2270/82
  USPC ......................................................... 303/20
  See application file for complete search history.

(56) References Cited

U.S. PATENT DOCUMENTS

| | | | | |
|---|---|---|---|---|
| 2011/0248558 | A1* | 10/2011 | Vollert | .................. B60T 13/586 303/3 |
| 2014/0346852 | A1* | 11/2014 | Thrasher | ............... B60T 8/4081 303/10 |
| 2014/0354036 | A1 | 12/2014 | Koo | |
| 2015/0028664 | A1* | 1/2015 | Choi | .................... B60T 13/745 303/3 |
| 2015/0061362 | A1 | 3/2015 | Kikawa et al. | |
| 2015/0375728 | A1* | 12/2015 | Kuhlman | .............. B60T 13/147 303/9.61 |
| 2016/0152221 | A1* | 6/2016 | Furuyama | ............. B60T 8/1761 303/11 |
| 2019/0135285 | A1* | 5/2019 | Goh | ...................... B60T 13/146 |

FOREIGN PATENT DOCUMENTS

| | | |
|---|---|---|
| CN | 106004826 A | 10/2016 |
| JP | 2000-255401 A | 9/2000 |
| JP | 2005-008047 A | 1/2005 |

\* cited by examiner

ELECTROHYDRAULIC BRAKE APPARATUS

CROSS-REFERENCE TO RELATED APPLICATIONS

The present application is based on, and claims priority from, Korean Patent Application Number 10-2020-0050087, filed on Apr. 24, 2020, the disclosure of which is incorporated by reference herein in its entirety.

TECHNICAL FIELD

Embodiments of the invention relate to an electrohydraulic brake apparatus.

BACKGROUND ART

The statements in this section merely provide background information related to the present disclosure and do not necessarily constitute prior art.

In conventional electrohydraulic brakes, an electric booster is responsible for braking all wheel brakes when a driver presses a pedal. That is, the required amount of a brake fluid required for braking needs to be sufficient to brake all of the wheel brakes. Thus, the electric booster corresponds to the driver's pedal force with respect to the required amount of the brake fluid sufficient for braking all of the wheel brakes. Thus, a motor having a higher torque specification should be used as the required amount of the brake fluid is larger. Therefore, there are disadvantageous problems in terms of the cost-effectiveness of the motor.

In addition, in the case of a vehicle having a large required amount of the liquid for braking the wheel brakes, the conventional electric booster has a problem that the driver feels a braking feeling as if the vehicle were being pushed during braking due to an excessive pedal force requirement of the driver, and the degradation of the feeling quality occurs.

SUMMARY

According to at least one embodiment, the present disclosure provides an electrohydraulic brake apparatus comprising: a reservoir configured to store a brake fluid; a stroke sensor configured to sense a pedaling amount of a brake pedal; a plurality of wheel brake assemblies configured to provide braking forces to wheels; a main master cylinder configured to discharge the brake fluid introduced from the reservoir to a first main line; an electric booster configured to boost a pedal force of a driver; an electronic stability control (ESC) system configured to receive the brake fluid discharged from the main master cylinder through the first main line and open or close a plurality of inlet valves disposed therein to change a pressure of the brake fluid discharged from the main master cylinder; and an electronic control unit (ECU) configured to control the ESC system so that a fluid pressure supplied to the ESC system brakes only part of the plurality of wheel brake assemblies when the pedaling amount is less than or equal to a first reference, and to control the ESC system so that the fluid pressure supplied to the ESC system brakes all of the plurality of wheels brake assemblies when the pedaling amount is greater than the first reference.

Figure 1:
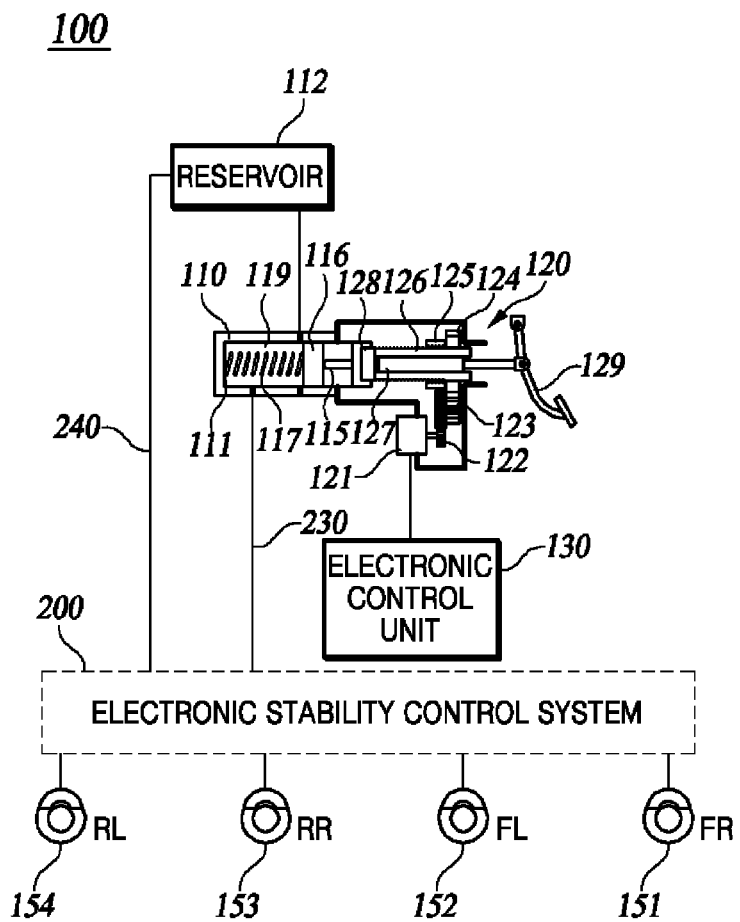
FIG. 1 is a block diagram of an electrohydraulic brake apparatus according to one embodiment of the present invention.

| REFERENCE NUMBERS | |
|---|---|
| 110: main body | 120: electric booster |
| 130: electronic control unit | 200: hydraulic control system |
| 150: wheels | |
| FL, RR, RL and FR: wheel brakes | |

DETAILED DESCRIPTION

An embodiment of the present invention is directed to providing a brake apparatus capable of reducing the required torque specification of a motor when compared with a conventional electric booster which is responsible for braking all wheels by braking only part of the plurality of wheels in low-response braking, thereby reducing manufacturing costs.

In addition, an embodiment of the present invention is directed to providing a pedal feel improvement effect for a driver by adding a braking force of a hydraulic control system in high-response braking to a braking force of an electric booster so that the number of rotations of a motor of the electric booster is smaller than that in low-response brake, thereby generating a pedal feeling difference between the high-response braking and the low-response braking.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), (a), (b), etc., in numbering components are used solely for the purpose of distinguishing one component from another but not to imply or suggest the substances, the order or sequence of the components. Throughout this specification, when a part "includes" or "comprises" a component, the part is meant to further include other components, not to exclude, unless there is a specific description contrary thereto.

FIG. 1 is a block diagram of an electrohydraulic brake apparatus according to one embodiment of the invention.

Referring to FIG. 1, an electrohydraulic brake apparatus 100 according to one embodiment of the present invention includes some or all of a main body 110, an electric booster 120, an electronic control unit 130, a hydraulic control system (hereinafter referred to as an electronic stability control (ESC) system) 200, and a plurality of wheel brake assemblies FR, FL, RR, and RL.

The main body 110 includes some or all of a stroke sensor (not shown), a main master cylinder 111, a reservoir 112, a push rod 115, a main piston 116, a return spring 117, and a main chamber 119.

The electric booster 120 includes some or all of a motor 121, a first gear 122, a second gear 123, a third gear 124, a nut screw 125, a bolt screw 126, an operating rod 127, a reaction disc 128, and a brake pedal 129.

The main master cylinder 111 is configured to press a brake fluid to form a hydraulic pressure used for braking. The reservoir 112 is configured to store the brake fluid therein. The push rod 115 is configured to press the main piston 116. The main piston 116 is configured to linearly move inside the main master cylinder 111 in response to the pressing of the push rod 115. The return spring 117 is configured to compress or expand according to linear movement of the main piston. The main chamber 119 is an internal space of the main master cylinder 111. The brake fluid discharged from the main master cylinder 111 flows into the main chamber 119.

The first gear 122, the second gear 123, and the third gear 124 are gears that transmit the rotational movement of the motor 121 to the nut screw 125. The nut screw 125 receives the rotational movement of the motor 121 and causes the bolt screw 126 to move linearly.

The main body 110 has an open right end. The return spring 117 is disposed at a left end of the main piston 116.

The left end of the main piston 116 is inserted into the open right end of the main body 110. A right end is closed by the main piston 116. The main piston 116 is disposed to be linearly movable to the left and right while in close contact with an inner wall of the main master cylinder 111.

A right end of the main piston 116 is connected to a left end of the push rod 115. A right end of the push rod 115 is connected to a left end of the reaction disc 128. A left end of the operating rod 127 is connected to the center of a right end of the reaction disc 128. The operating rod 127 is connected to the brake pedal 129 of a driver. The operating rod 127 is configured to transmit a pedal force of the driver to the reaction disc 128. The reaction disc 128 is configured to press the push rod 115. That is, the operating rod 127 presses the center of the right end of the reaction disc 128 with the pedal force of the brake pedal 129 of the driver.

The outer contour of the right end of the reaction disc 128 is connected to the bolt screw 126. The first gear 122 and the second gear 123 are rotated by receiving a torque from the motor 121. This rotational movement is transmitted to the third gear 124. The third gear 124 transmits a torque generated due to the rotational movement to the nut screw 125. The bolt screw 126 linearly moves according to the rotational movement of the nut screw 125. The outer contour of the right end of the reaction disc 128 is thus pressed by the linear movement of the bolt screw 126. As a result, the push rod 115 is pressed by a pedal force of the brake pedal 129 of the driver and a boosting force of the electric booster 120.

Figure 2:
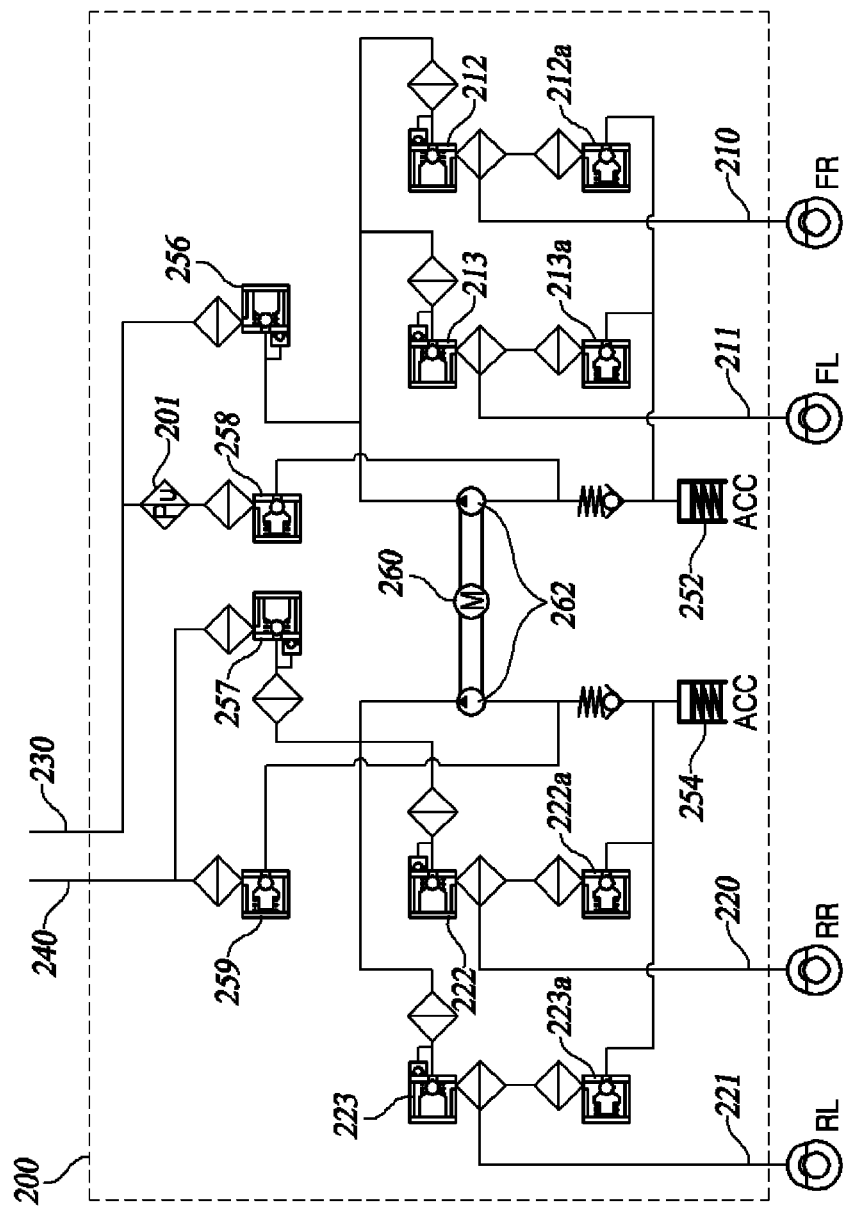
FIG. 2 is a block diagram of an electronic stability control (ESC) system according to one embodiment of the present invention.

The main piston 116 is pressed by the push rod 115 to discharge the brake fluid in the main master cylinder 111 to a first main line 230 (see FIG. 2). In other words, the brake fluid discharged from the reservoir 112 is transmitted to the main master cylinder 111, and the braking fluid discharged from the main master cylinder 111 is transmitted to the electronic stability control system 200 along the first main line 230. Here, the first main line 230 is configured to transmit the brake fluid discharged from the main master cylinder 111 to the electronic stability control system 200.

In the present disclosure, a case where the pedaling amount of the driver is smaller than or equal to a first reference is referred to as low-response braking, and a case where the pedaling amount of the driver is greater than the first reference is referred to as high-response braking. Here, the first reference is a point α in the graph of FIG. 3B.

When the driver presses the brake pedal 129, the stroke sensor senses the pedaling amount and transmits the pedaling amount to the electronic control unit 130.

The electronic control unit 130 receives the pedaling amount measured by the stroke sensor. The electronic control unit 130 generates a first braking signal when the pedaling amount is less than or equal to the first reference, while a second braking signal is generated in a case where the pedaling amount is greater than the second reference. The first braking signal is an electrical signal transmitted for generating a braking force only to part (e.g., FR and RL) of the plurality of wheel brake assemblies FR, FL, RR, and RL. The second braking signal is an electrical signal transmitted for generating a braking force to all of the wheel brake assemblies FR, FL, RR, and RL. The electronic control unit 130 transmits these electrical signals to the electronic stability control (ESC) system 200.

When a hydraulic control part (not shown) of the ESC system 200 receives the first braking signal, only part of the plurality of wheel brakes FR, FL, RR, and RL provide a braking force to the wheels. Here, at least some wheel brakes are preferably the wheel brakes on the front wheels FR and FL. On the other hand, when the hydraulic control unit (not shown) of the ESC system 200 receives the second braking signal, all of the wheel brake assemblies FR, FL, RR, and RL provide a braking force to the wheels.

According to the present embodiment, the main chamber 119 inside the main master cylinder 111 has a single chamber structure. Here, the single chamber structure is a chamber in which a space inside the main master cylinder 111 is composed of one area, and a tandem chamber structure is a chamber in which a space inside the main master cylinder 111 is composed of a plurality of areas. Since the electric booster 120 according to the present embodiment is responsible for braking only part of the plurality of wheel brakes in low-response braking, the amount of the brake fluid required for wheel brake braking is reduced as compared to the case of braking all of the plurality of wheel brakes.

The present embodiment can reduce the volume of the main master cylinder 111 by a reduced amount of the brake fluid compared to a case in which the main master cylinder configured in the tandem chamber structure is used. The reduction in volume of the main master cylinder 111 causes a reduction in diameter of the main master cylinder 111 and therefore a reduction in diameter of the main piston 116. When an output of the electric booster 120 is the same, the smaller the diameter of the main master cylinder 111, the larger the hydraulic boosting ratio of the discharged brake fluid. Here, the hydraulic boosting ratio is a ratio of a cross-sectional area of a piston (not shown) connected to the wheel brake assembly to a cross-sectional area of the main piston 116. Therefore, the smaller the cross-sectional area of the main piston 116, the larger the relative ratio of the cross-sectional area of the piston (not shown) connected to the wheel brake, and therefore the boosting ratio is increased.

An output of the motor 121 is determined by a torque specification of the motor 121 and RPM of the motor 121, and an increase in the hydraulic boosting ratio allows the use of a motor 121 having a lower output than a conventional motor. As the output of the motor 121 is lowered, it is possible to use the motor 121 having a low torque amount even without increasing the RPM. That is, even when the torque specification of the motor 121 is reduced, it is possible to form a hydraulic pressure having the same size as that of the conventional motor. Therefore, by using the motor 121 having a low torque amount, it is possible to reduce the cost of the motor 121 of the electric booster 120.

By configuring the main master cylinder 111 as a single chamber rather than a tandem chamber in a conventional manner, even when only part (e.g., FR and FL) of the plurality of wheel brakes FR, FL, RR, and RL are braked, it is possible to satisfy the regulations relating to the emergency braking performance. When leakage occurs in a hydraulic circuit on the main master cylinder 111 of the electric booster 120, and a problem occurs in braking performance, the ESC system 200 can brake the wheel brake. Therefore, redundancy of the hydraulic circuit during emergency braking can be secured, and thus there is no problem in complying with the emergency braking performance law. Consequently, the main master cylinder 111 formed of a single chamber is reduced in cost when compared with the main master cylinder formed of a tandem chamber.

In addition, in the electric booster 120 according to the present embodiment, the braking force of the ESC system 200 is added in high-response braking, so that the rotation of the motor 121 of the electric booster 120 is reduced compared to low-response braking. When the number of rotations of the motor 121 is reduced, in high-response braking, a greater pedal force for braking the vehicle than that in low-response braking is needed from the driver. In other words, a relatively small pedal force is required from the driver in low-response braking, and a relatively large pedal force is needed from the driver in high-response braking. The present invention provides a brake apparatus in which the pedal feel of a driver is improved due to the difference in pedal forces described above.

FIG. 2 is a block diagram of the electronic stability control (ESC) system according to one embodiment of the present invention.

Referring to FIG. 2, the ESC system 200 according to one embodiment of the present invention includes some or all of a pressure sensor 201, a first inlet line 210, a second inlet line 211, a third inlet line 220, a fourth inlet line 221, a first inlet valve 212, a second inlet valve 213, a third inlet valve 222, a fourth inlet valve 223, a first outlet valve 212a, a second outlet valve 213a, a third outlet valve 222a, a fourth outlet valve 223a, a first main line 230, a second main line 240, a plurality of accumulators 252 and 254, a plurality of traction control valves 256 and 257, a plurality of high-pressure suction valves 258 and 259, an actuating unit 260, a hydraulic pump 262, and a hydraulic control part (not shown).

The plurality of wheel brakes FR, FL, RR, and RL include some or all of a first wheel brake FR for braking a front right wheel 151 of a vehicle, a second wheel brake FL for braking a front left wheel 152 of the vehicle, a third wheel brake RR for braking a rear right wheel 153 of the vehicle, and a fourth wheel brake RL for braking a rear left wheel 154 of the vehicle.

The pressure sensor 201 is provided inside the ESC system 200. The pressure sensor 201 measures a hydraulic pressure in the ESC system 200 and transmits the measured hydraulic pressure to the hydraulic control part (not shown). The hydraulic control part (not shown) determines a point a in FIG. 3B based on a value measured by the pressure sensor 201 together with a braking signal sent to the electronic control unit 130 to control the ESC system 200. However, the present embodiment is not limited thereto, and the point α in FIG. 3B can be determined using only the braking signal transmitted from the electronic control unit 130.

The ESC system 200 controls opening or closing of the plurality of traction control valves 256 and 257, the plurality of high-pressure suction valves 258 and 259, the actuating unit 260, the plurality of inlet valves 212, 213, 222, and 223, and the plurality of outlet valves 212a, 213a, 222a, and 223a so that the brake fluid is moved to the main master cylinder 111, the reservoir 112, and the plurality of wheel brake assemblies FR, FL, RR, and RL through the line.

The plurality of traction control valves 256 and 257 are configured to interrupt the hydraulic pressure in the ESC system 200. A first traction control valve 256 may be appropriately disposed on the path of the line corresponding to the first main line 230, i.e., supplying the hydraulic pressure to the first and second wheel brakes FR and FL. A second traction control valve 257 may be appropriately disposed on the path of the line corresponding to the second main line 240, that is, supplying the hydraulic pressure to the third and fourth wheel brake assemblies RR and RL.

The plurality of high-pressure suction valves 258 and 259 are configured to interrupt the hydraulic pressure of the brake fluid supplied to an inlet of the hydraulic pump 262. A first high-pressure suction valve 258 may be appropriately disposed on the path of the line corresponding to the first main line 230, i.e., supplying the hydraulic pressure to the first and second wheel brakes FR and FL. A second high-pressure suction valve 259 may be appropriately disposed on the path of the line corresponding to the second main line 240, that is, supplying the hydraulic pressure to the third and fourth wheel brakes RX and RL.

The plurality of outlet valves 212a, 213a, 222a, and 223a are disposed on the plurality of outlet lines 210a and 220a. The plurality of outlet valves 212a, 213a, 222a, and 223a are configured to interrupt the hydraulic pressures discharged from the plurality of wheel brakes FR, FL, RR, and RL.

The ESC system 200 may further include the low-pressure accumulators 252 and 254. The plurality of accumulators 252 and 254 are configured to temporarily store a brake fluid discharged from the plurality of wheel brakes FR, FL, RR, and RL. Meanwhile, the accumulators 252 and 254 may be disposed inside the ESC system 200.

The first inlet line 210 includes the first inlet valve 212. The second inlet line 211 includes the second inlet valve 213. The first inlet valve 212 is disposed adjacent to the first wheel brake FR, and the second inlet valve 213 is disposed adjacent to the second wheel brake FL.

The ESC system 200 opens or closes the first inlet valve 212 and the second inlet valve 213 to change a hydraulic pressure of the brake fluid in the first and second inlet lines 210 and 211. That is, the first inlet line 210 and the second inlet line 211 transmit the brake fluid only to part (for example, FR and FL) of the plurality of wheel brakes FR, FL, RR, and RL according to a change in hydraulic pressure.

The third inlet line 220 includes the third inlet valve 222. The fourth inlet line 221 includes the fourth inlet valve 223. The third inlet valve 222 is disposed adjacent to the third wheel brake RR, and the fourth inlet valve 223 is disposed adjacent to the fourth wheel brake RL.

The ESC system 200 opens or closes the third inlet valve 222 and the fourth inlet valve 223 to change the hydraulic pressure of the brake fluid in the third and fourth inlet lines 220 and 221. That is, the third inlet line 220 and the fourth inlet line 221 transmit the brake fluid to the remaining wheel brakes RR and RL among the plurality of wheel brakes FR, FL, RR, and RL according to a change in hydraulic pressure.

The first main line 230 is connected from the main master cylinder 111 to the ESC system 200. The first main line 230 is configured to transmit a brake fluid discharged from the main master cylinder 111 to the ESC system 200.

The second main line 240 is directly connected to the ESC system 200 from the reservoir 112. Here, the direct connection means that the brake fluid is connected from the reservoir 112 to the ESC system 200 without passing through the main master cylinder 111. Accordingly, the brake fluid discharged from the reservoir 112 is transmitted to the ESC system 200 along the second main line 240.

The plurality of wheel brake assemblies FR, FL, RR, and RL provide braking forces to the plurality of wheels 151, 152, 153, and 154 by using the hydraulic pressure of the brake fluid discharged from the ESC system 200.

The first wheel brake FR is connected through the first inlet line 210. The second wheel brake FL is connected through the second inlet line 211. The third wheel brake RR is connected through the third inlet line 220. The fourth wheel brake RL is connected through the fourth inlet line 221.

When the hydraulic control part (not shown) receives the first braking signal, the brake fluid introduced from the main master cylinder 111 is discharged only to the first inlet line 210 and the second inlet line 211. When the hydraulic control part (not shown) receives the second braking signal, the high-pressure suction valve 259 is opened, and the brake fluid is suctioned from the reservoir 112 through the second main line 240 by controlling the actuating unit 260 to add the braking force by the ESC system 200. The brake fluid flowing into the ESC system 200 is discharged through all the inlet lines 210, 211, 220, and 221. That is, when the first braking signal is received, only part (e.g., FR and FL) of the wheel brakes FR, FL, RR, and RL are braked, and when the second braking signal is received, all of the wheel brakes FR, FLO, RR, and RL are braked.

Figure 3:
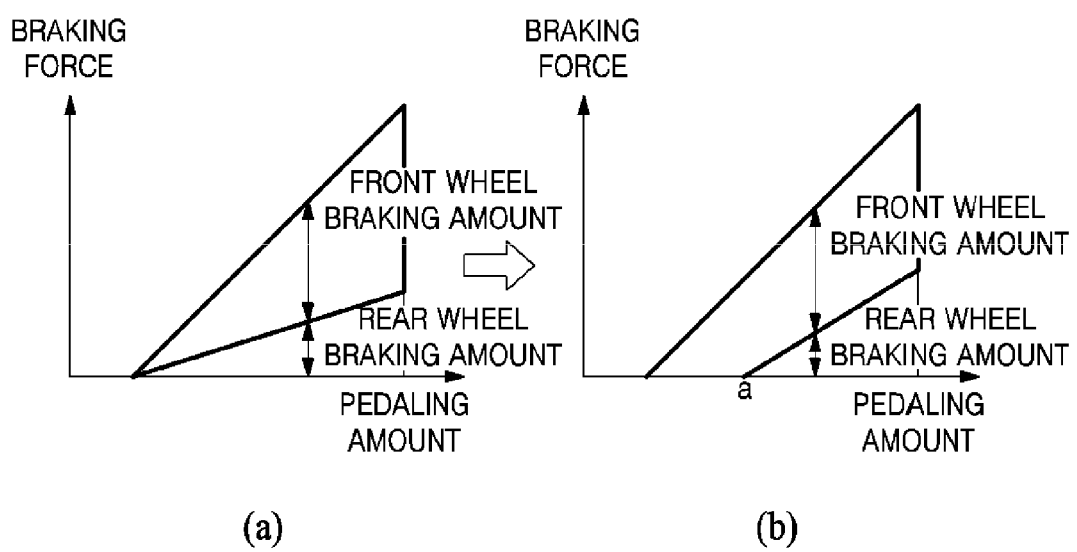
FIG. 3 is a graph of braking distribution according to one embodiment of the present invention.

FIG. 3 is a graph of braking force distribution according to one embodiment of the present invention.

Referring to FIG. 3, in the conventional braking distribution according to the graph in FIG. 3A, when a braking demand of a driver occurs, a rear wheel braking amount and a front wheel braking amount are generated together from the beginning to form a braking force. In the braking distribution according to the embodiment of the present invention, only the front wheels are braked by the electric booster 120 when it is not sudden braking or high-response braking (up to a point α of the graph) according to the graph in FIG. 3B.

In the case of an electric vehicle or a hybrid vehicle equipped with a conventional front wheel drive motor, only front wheels are regeneratively braked when regenerative braking is performed, but similarly, in the low-response braking of the present embodiment, since it is already known that there is no significant problem in safety even when only the front wheels are braked, the operation of the ESC system 200 can be minimized.

When the pedaling amount of the driver is greater than the point a, rear wheel braking by the ESC system 200 is started and braking is performed as shown in the graph in FIG. 3B. According to known statistics, a braking of less than 0.3 g (g is gravitational acceleration) corresponds to about 95% of the total braking. Accordingly, when the braking scheme is established, the ESC system 200 is operated only at the time of sudden braking of less than 5%, and therefore there is no significant influence on the endurance performance of the ESC system 200. In addition, since braking is performed only by the electric booster 120 in low-response braking, no noise problem occurs due to the operation of the ESC system 200.

In front wheel braking in high-response braking, the front wheel is not braked only by the electric booster 120, but a section in which the ESC system 200 and the electric booster 120 operate at the same time is formed, and the electric booster 120 drives the motor less than in the case of low-response braking. Thus, the motor specification can be further reduced, thereby reducing the cost more.

In contrast to a braking apparatus using a conventional vacuum booster, the vacuum booster operates only passively, but the electric booster 120 is capable of active control, so that in low-response braking, only part of the plurality of wheels are braked so that the number of rotations of the motor is increased more than that in high-response braking, and in high-response braking of the driver, the number of rotations of the motor is decreased to the extent that braking of the remaining wheels is added by the ESC system. In other words, a relatively small pedal force is required from the driver in low-response braking, and a relatively large pedal force is needed from the driver in high-response brake. The present invention provides a brake apparatus in which the pedal feel of the driver is improved due to the difference in pedal forces described above.

Figure 4:
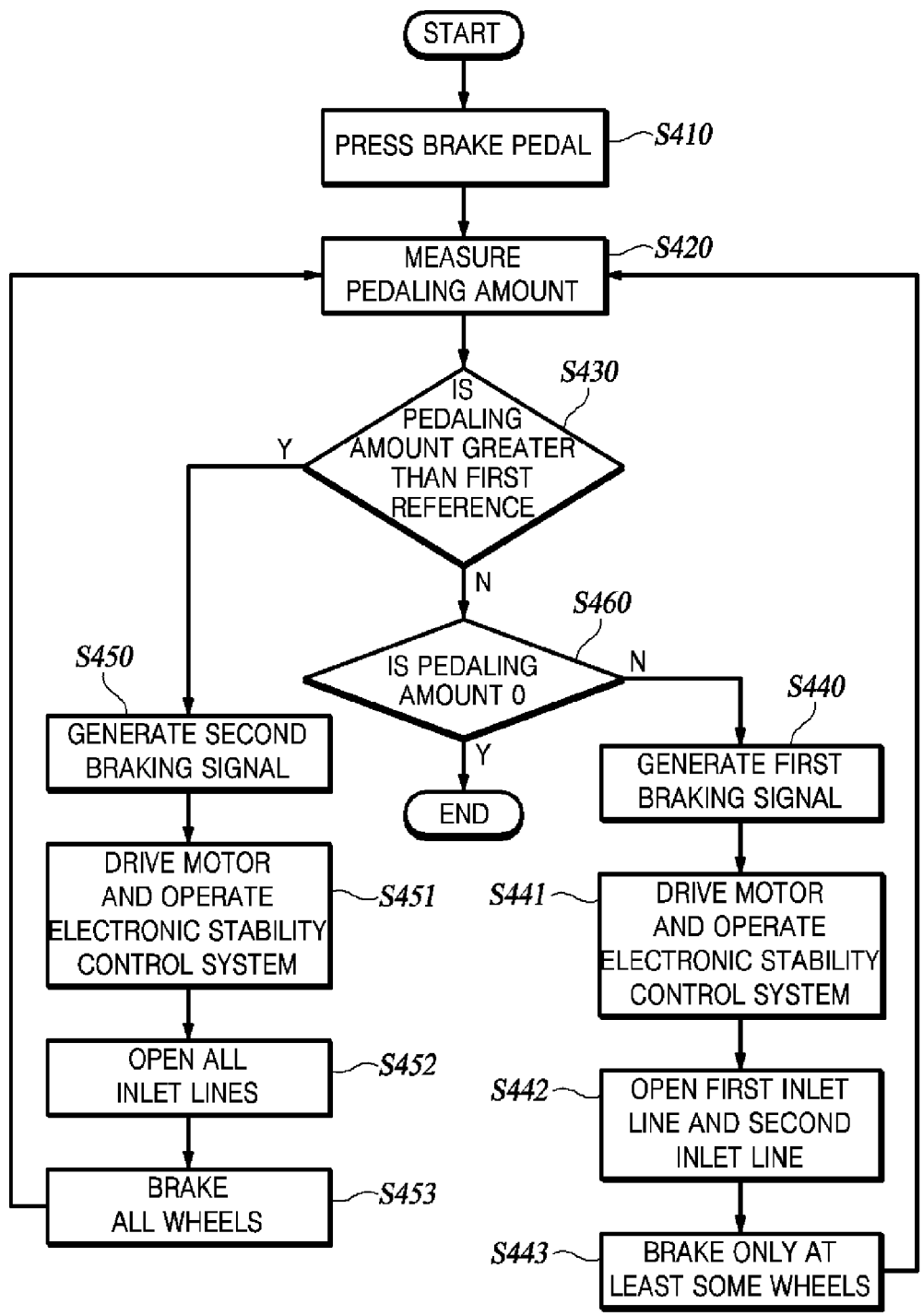
FIG. 4 is a flowchart of an electrohydraulic brake apparatus according to one embodiment of the present invention.

FIG. 4 is a flowchart of an electrohydraulic brake apparatus according to one embodiment of the present invention.

When a driver presses a brake pedal 129 (S410), a stroke sensor measures a pedaling amount (S420).

An electronic control unit 130 compares the measured pedaling amount with a first reference (S430) to generate a first braking signal (S440) when the pedaling amount is smaller than or equal to the first reference and to generate a second braking signal (S450) when the pedaling amount is greater than the first reference to transmit the braking signal to an ESC system 200.

Upon receiving the braking signal, the ESC system 200 opens or closes a plurality of valves formed therein and changes the hydraulic pressure of the brake fluid to control a plurality of wheel brake assemblies FL, RR, RL, and FR.

Upon receiving the first braking signal, a motor 121 of an electric booster 120 is driven to boost the pedal force of the driver (S441). The brake fluid is discharged from a main master cylinder 111 according to the pedal force of the driver. The brake fluid flows into the ESC system 200 along a first main line 230, and then the ESC system 200 opens a first inlet line 210 and a second inlet line 211 (S442). The brake fluid transmits a braking force only to part of the plurality of wheel brakes FL, RR, RL, and FR (for example, FR and FL) along the first inlet line 210 and the second inlet line 211 (S443).

Upon receiving the second braking signal, the motor 121 of the electric booster 120 is driven to boost the pedal force of the driver (S451). The brake fluid is discharged from the main master cylinder 111 according to the pedal force of the driver. The brake fluid flows into the ESC system 200 along a first main line 230. Further, as an actuating unit 260 operates, a high-pressure suction valve 259 is opened and the brake fluid flows into the ESC system 200 along a second main line 240. Thereafter, the ESC system 200 opens all of the inlet lines 210, 211, 220, and 221 (S452). The brake fluid causes all of the wheel brakes FL, RR, RL, and FR to be braked along all of the inlet lines 210, 211, 220, and 221 (S453).

The electronic control unit 130 repeats a braking process and consecutively measures the pedaling amount of the driver, and then, when the pedaling amount reaches zero (S460), all of the inlet lines 210, 211, 220, and 221 of the ESC system 200 are closed and the braking control process ends.

As described above, according to the present embodiment, only part of a plurality of wheels are braked in low-response braking, and a braking force of a hydraulic control system is added to a braking force by an electric booster to brake all of the wheels in high-response braking. By braking only part of the plurality of wheels in low-response braking, a torque specification of a motor can be reduced as compared to a conventional electric booster responsible for braking all of the wheels, thereby reducing manufacturing costs.

In addition, the embodiment of the present invention can reduce the number of rotations of a motor of an electric booster to be smaller than that in low-response braking by adding a braking force of a hydraulic control system to a braking force by the electric booster in high-response braking. When the number of rotations of the motor is reduced, a driver requires a greater pedal force for braking a vehicle in high-response braking than in low-response braking. In other words, a relatively small pedal force is required from the driver in low-response braking, and a relatively large pedal force is needed from the driver in high-response brake. There is an effect of improving the pedal feel for the driver due to a difference in the pedal forces described above.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above descriptions but by the claims and equivalents thereof.

What is claimed is:

1. An electrohydraulic brake apparatus comprising:
   a reservoir configured to store a brake fluid;
   a stroke sensor configured to sense a pedaling amount of a brake pedal;
   a plurality of wheel brake assemblies configured to provide braking forces to wheels;
   a main master cylinder configured to discharge the brake fluid introduced from the reservoir to a first main line;
   an electric booster configured to boost a pedal force of a driver;
   an electronic stability control (ESC) system configured to receive the brake fluid discharged from the main master cylinder through the first main line and open or close a plurality of inlet valves disposed therein to change a pressure of the brake fluid discharged from the main master cylinder; and
   an electronic control unit (ECU) configured to control the ESC system so that a fluid pressure supplied to the ESC system brakes only part of the plurality of wheel brake assemblies when the pedaling amount is less than or equal to a first reference, and to control the ESC system so that the fluid pressure supplied to the ESC system brakes all of the plurality of wheel brake assemblies when the pedaling amount is greater than the first reference,
   wherein the ECU controls the ESC system so that an increasing rate of a braking force applied to only the part of the plurality of wheel brake assemblies when the pedaling amount is less than or equal to the first reference is different from an increasing rate of a braking force applied to a remaining part of the plurality of wheel brake assemblies when the pedaling amount is greater than the first reference.

2. The electrohydraulic brake apparatus of claim 1, wherein the main master cylinder is a single chamber.

3. The electrohydraulic brake apparatus of claim 1, wherein the ESC system includes a first inlet line and a second inlet line, connected to some of the plurality of wheel brake assemblies, the first and second inlet lines including first and second inlet valves, respectively, and
   the ESC system opens the first inlet valve and the second inlet valve to brake only the part of the plurality of wheel brake assemblies when the pedaling amount is less than or equal to the first reference.

4. The electrohydraulic brake apparatus of claim 3, wherein the ESC system further includes a third inlet line and a fourth inlet line, connected to some of the plurality of wheel brake assemblies, the third and fourth inlet lines including third and fourth inlet valves, respectively, and
   the ESC system opens all inlet valves of the first to fourth inlet valves to brake all of the plurality of wheel brake assemblies when the pedaling amount is greater than the first reference.

5. The electrohydraulic brake apparatus of claim 1, wherein the part of the plurality of wheel brake assemblies are on front wheels.

6. A method of controlling an electrohydraulic brake, comprising:
   sensing, by a stroke sensor, a pedaling amount of a brake pedal;
   generating, by an electronic control unit, a first braking signal when the pedaling amount is less than or equal to a first reference, and generating and transmitting, by the electronic control unit, a second brake signal to an electronic stability control (ESC) system when the pedaling amount is greater than the first reference; and
   opening or closing a plurality of inlet valves disposed in the ESC system in response to the first or second braking signal to change a pressure of a brake fluid discharged from a main master cylinder to brake a plurality of wheel brake assemblies,
   wherein the generating and transmitting a first braking signal and a second brake signal to an ESC system includes
   controlling the ESC system so that a fluid pressure supplied to the ESC system brakes only part of the plurality of wheel brake assemblies when the first braking signal is received, and controlling the ESC system so that the fluid pressure supplied to the ESC system brakes all of the plurality of wheel brake assemblies when the second braking signal is received, and
   wherein an increasing rate of a braking force applied to only the part of the plurality of wheel brake assemblies when the first braking signal is received is different from an increasing rate of a braking force applied to a remaining part of the plurality of wheel brake assemblies when the second braking signal is received.

7. The method of claim 6, wherein the opening or closing a plurality of inlet valves includes opening a first inlet line and a second inlet line to brake only part of the plurality of wheel brake assemblies when the first braking signal is received.

8. The method of claim 6, wherein the opening or closing a plurality of inlet valves includes opening all inlet lines, including the first and second inlet lines and additional inlet lines, to further brake the remaining part of the plurality of wheel brake assemblies when the second braking signal is received.

9. The method of claim 7, wherein the opening or closing a plurality of inlet valves includes braking only front wheels.

\* \* \* \* \*